Figures 1, 2:
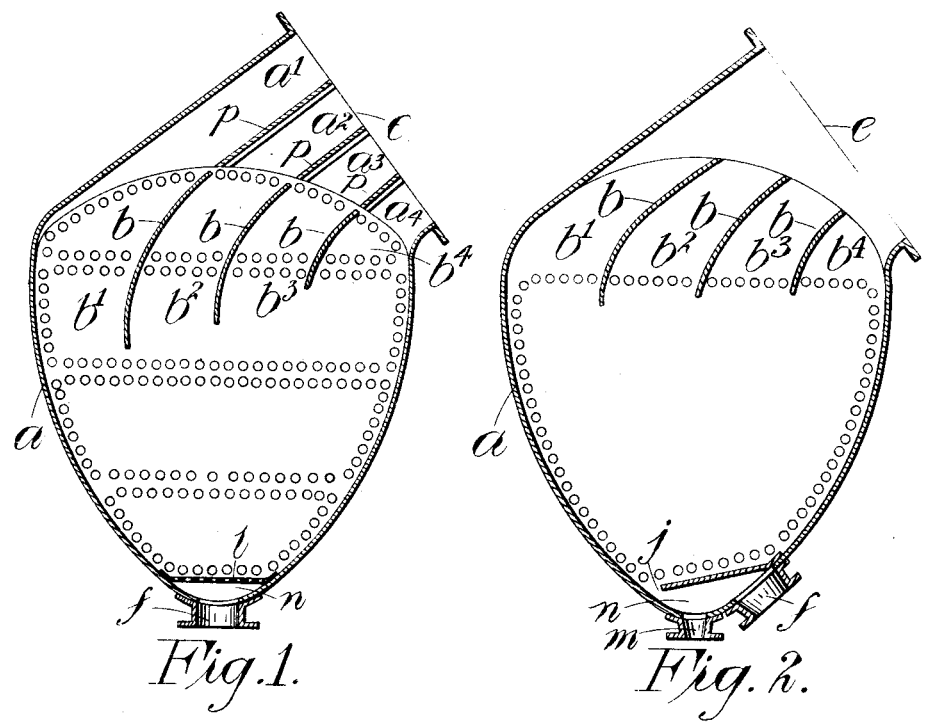

D. B. MORISON.
APPARATUS FOR CONDENSING STEAM.
APPLICATION FILED MAY 26, 1913.

1,089,942.

Patented Mar. 10, 1914.

Attest: Fig. 3.

Ewd L. Johson
H. L. Alden

Inventor
Donald B. Morison
by Then Middleton Donaldson Shea
Atty

UNITED STATES PATENT OFFICE.

DONALD BARNS MORISON, OF HARTLEPOOL, ENGLAND.

APPARATUS FOR CONDENSING STEAM.

1,089,942.  Specification of Letters Patent.  Patented Mar. 10, 1914.

Application filed May 26, 1913. Serial No. 769,929.

*To all whom it may concern:*

Be it known that I, DONALD BARNS MORISON, a subject of the King of Great Britain and Ireland, residing at Hartlepool, in the county of Durham, England, have invented the Improvements in and Connected with Apparatus for Condensing Steam, of which the following is a specification.

I have found by investigation and experiment that condensing efficiency is promoted in a surface condenser when the aerated steam is so delivered as to pass over the condensing surface in a continuous current having uniform distribution and uniform direction of flow toward the outlet or outlets from the condensing chamber.

It is known that the insulating effect of the air particles which impinge on the tubes at the steam-entry is prejudicial to condensing efficiency, while at the exit the air density may be such as to render the tube surface practically inoperative for the condensation of vapor.

It is known that steam enters a condenser, as for example from a steam turbine, at a velocity of about five hundred feet per second, and that at this velocity the kinetic energy of flow is considerable.

In surface condensers in which the direction of the steam flow over the surface at the entry is not linearly toward the surface at the exit, a whirling effect is produced which is conducive to the formation of eddies, this effect being intensified by irregular or disturbed inlet currents. In turbine driven warships, for example, it is usually necessary to provide a condenser with a side inlet or an end inlet. Such arrangements facilitate eddying and cause air particles to make repeated appearances in a given plane whereby they cause cumulative insulating effect and reduce the efficiency of the heat transferring surfaces.

The object of the present invention is a construction of surface condenser whereby the steam is so delivered as to pass over the condensing surface in a continuous current having such uniform distribution and such direction as will promote stream lines of flow vertically or obliquely downward toward the air outlet or air outlets so that eddying of air particles in their passage through the condensing chamber is minimized or prevented, and as will enable the kinetic energy of flow to be utilized as far as practical conditions will allow, for, as it were, compressing the air into the air outlet or air outlets and so assisting the air pump to maintain in its air suction system, under given conditions a minimum of air pressure, whereby the weight of air normally contained in the condensing chamber is so reduced and the air insulating effect on the heat transferring efficiency of the tube surface is so lessened that a given quantity of condensing water at a given inlet temperature will carry off more heat, the temperature of the condensing chamber being thereby lowered and the vacuum raised.

The accompanying drawings, which are more or less diagrammatic, illustrate various constructions of condensers according to my invention.

Figure 1 is a vertical cross section of a surface condenser that is of V-shaped section. Exhaust steam is delivered to the condenser $a$ through the inlet $e$, and the air is withdrawn, together it may be with the water of condensation, from the tubeless chamber $n$ through the outlet $f$. The steam inlet $e$ is divided by the plates $p$ into passages $a^1$, $a^2$, $a^3$, $a^4$, in a known manner, but according to this invention, the passages are continued by means of plates $b$ into the condenser $a$, the plates being arranged to direct the current of steam so that its stream lines of flow are toward the air outlet $f$, whereby the eddying of air particles in the condensing chamber is prevented or minimized and the kinetic energy of such stream lines of flow is utilized for driving the aerated vapor onward and downward through the passages $b^1$, $b^2$, $b^3$, $b^4$ toward the perforated plate $l$ with the object of compressing the air into the tubeless chamber $n$ forming part of the air pump suction system, and thus promoting the efficiency of the air pump.

In Fig. 2 which is a modification of Fig. 1, the plates in the exhaust steam inlet $e$ are omitted, and the steam directing plates $b$ are arranged in the steam space between the first row of condensing tubes and the exhaust steam inlet, the stream lines of steam flow being directed by the passages $b^1$, $b^2$, $b^3$ and $b^4$ toward the opening $j$ into the tubeless chamber $n$ from which the air and water are separately withdrawn through the outlets $f$ and $m$.

Fig. 3 illustrates the application of my invention to a circular condenser. In this example the plates $b$ extend from the exhaust steam inlet $e$ to approximately half way across the condenser, the passages $b^1$, $b^2$, $b^3$ directing the stream lines of steam flow toward the opening $j$ into an air cooling chamber $d$ from which the air is withdrawn through the outlet $f$, the water of condensation being withdrawn through the outlet $m$.

Figure 4:
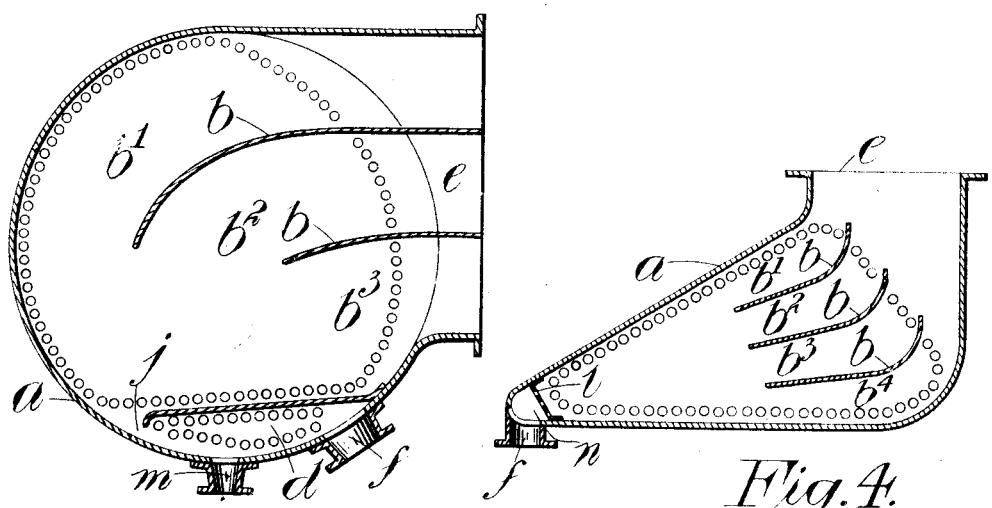

In the condenser shown in Fig. 4, the exhaust steam inlet $e$ is at the top, the flow of steam being directed across the condenser to the outlet $f$ by means of the plates $b$ which extend from the first row of tubes toward the perforated plate $l$ through which the air is delivered into the tubeless chamber $n$ forming part of the air pump suction system.

I am aware that it is common practice to arrange plates in a condenser inlet to strengthen the structure and to assist in distributing the entering steam, and I am also aware that the disposition of the tubes together with the rapid condensation of the vapor tend to quickly destroy the kinetic energy of flow, but by the judicious disposition of steam directing plates according to my invention, the useful effect of the kinetic energy is increased in the manner hereinbefore described.

The construction according to this invention may be applied to condensers of any design and to any disposition or angle of steam supply, also the directing plates may be coincident with, or terminate between, guide plates such as described and illustrated in the specification of Letters Patent No. 979,540 of 1910.

What I claim is:—

1. In steam condensing apparatus, a steam condensing compartment having condensing tubes, an inlet for steam, an air outlet connected to an air pump suction system, and a plurality of plates arranged with their upper extremities lying in planes parallel with the direction of steam flow through said inlet, the lower extremities of said plates being so directed that the stream lines of steam flow deflected by the plates are directed toward said air outlet, thus utilizing the kinetic energy of the steam to compress the air through the air outlet into said pump suction system.

2. In steam condensing apparatus, a steam condensing compartment having a steam inlet that is divided by longitudinal plates into multiple passages, a plurality of plates extending into said condensing compartment and so arranged that the steam current issuing from said passages is deflected by said plurality of plates and is so directed that its stream lines of flow are toward the air outlet from said condensing chamber, for the purpose set forth.

3. In steam condensing apparatus, the combination with a steam condensing compartment of steam current deflecting plates arranged in the steam inlet to said compartment, said plates directing the steam current toward the air outlet.

4. In steam condensing apparatus, the combination with a steam condensing compartment of steam current deflecting plates arranged in the steam space preceding the condensing surface, said plates directing the steam current toward the air outlet.

5. In steam condensing apparatus, a steam condensing compartment having condensing tubes, an inlet for steam angularly disposed with regard to an air outlet, and a plurality of plates arranged with their upper extremities lying in planes parallel with the direction of steam flow through said inlet, the lower extremities of said plates being so directed that the stream lines of steam flow deflected by the plates are directed toward said air outlet.

6. In steam condensing apparatus, a steam condensing compartment having condensing tubes, an inlet for steam, an air outlet, a plurality of plates arranged with their upper extremities lying in planes parallel with the direction of steam flow through said inlet, the lower extremities of said plates being so directed that the stream lines of steam flow deflected by the plates are directed toward said air outlet, and an outlet chamber with which said air outlet communicates, said chamber having an outlet for fluid.

7. In steam condensing apparatus, a steam condensing compartment having condensing tubes, an inlet for steam, an air outlet, a plurality of plates arranged with their upper extremities lying in planes parallel with the direction of steam flow through said inlet, the lower extremities of said plates being so directed that the stream lines of steam flow deflected by the plates are directed toward said air outlet, and an air cooling chamber with which said air outlet communicates.

8. In steam condensing apparatus, a steam condensing compartment having condensing tubes, an inlet for steam, an air outlet, a plurality of plates arranged with their upper extremities lying in planes parallel with the direction of steam flow through said inlet, the lower extremities of said plates being so directed that the stream lines of steam flow deflected by the plates are directed toward said air outlet, and an air cooling chamber with which said air outlet communicates, said chamber having separate outlets for air and water.

Signed at West Hartlepool, in the county of Durham, England, this 8th day of May 1913.

DONALD BARNS MORISON.

Witnesses:
HARRY GOTHEYILL,
JAMES CAMDEN RUSSELL.